Patented Jan. 11, 1927.

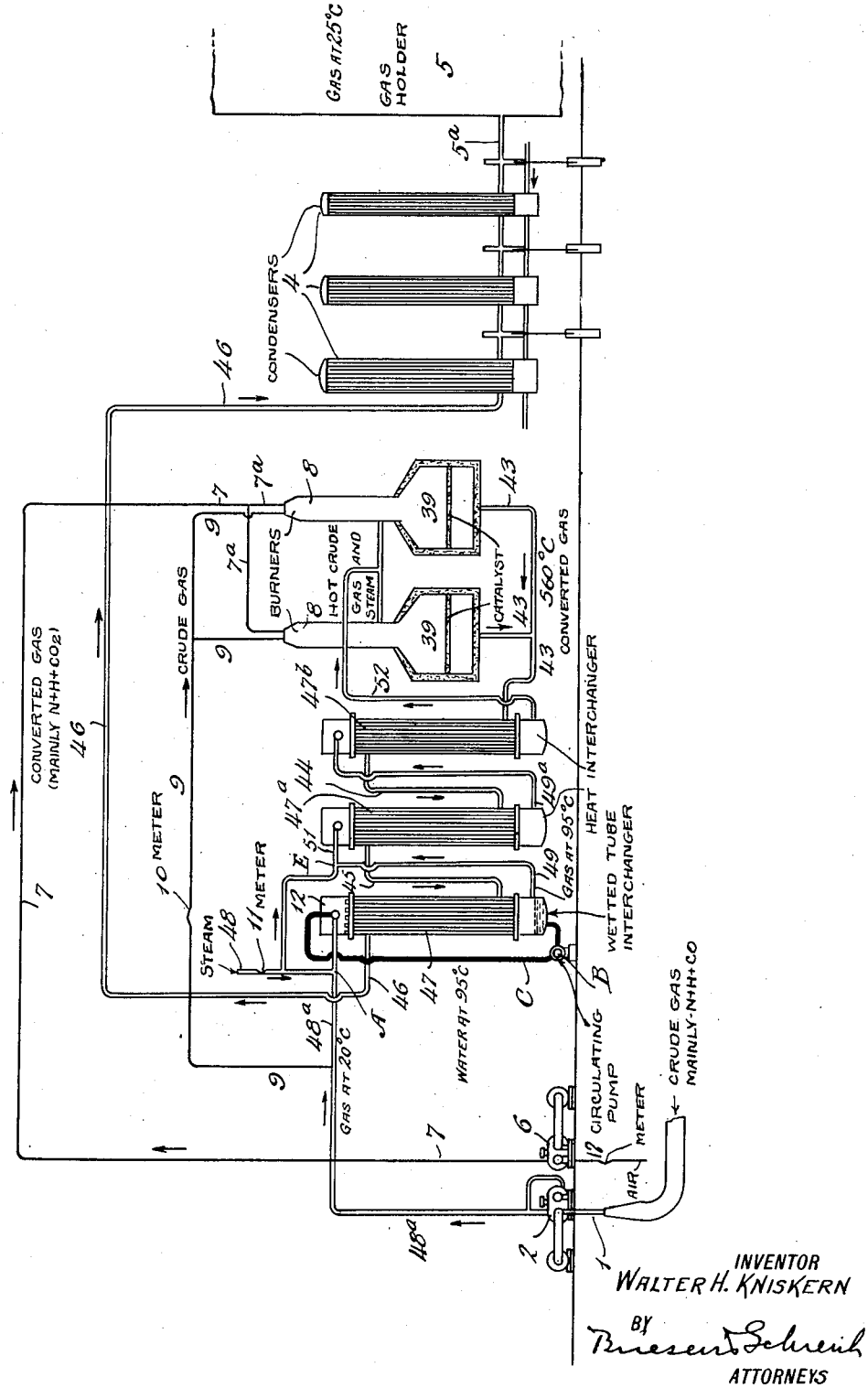

1,614,072

UNITED STATES PATENT OFFICE.

WALTER H. KNISKERN, OF SYRACUSE, NEW YORK, ASSIGNOR TO ATMOSPHERIC NITROGEN CORPORATION, OF SOLVAY, NEW YORK, A CORPORATION OF NEW YORK.

PROCESS AND APPARATUS FOR TREATMENT OF GAS CONTAINING CARBON MONOXIDE.

Application filed September 21, 1923. Serial No. 663,956.

This invention relates to the treatment of gas utilized in the production of a nitrogen-hydrogen mixture suitable for use in subsequent ammonia synthesis. The object of the invention is to treat a gas containing carbon monoxide in a special manner to make it peculiarly adaptable for the stage in which said gas mixed with steam is subjected to catalysis, whereby hydrogen of the steam is liberated as hydrogen with simultaneous oxidation of CO to $CO_2$. The invention may be profitably employed irrespective of the particular type of subsequent operations to be performed upon the ultimately resultant gas. The invention is, however, preferably employed in connection with and is consequently described from the standpoint of the synthetic ammonia process generally known as the de Jahn process. According to that process a hydrogen-nitrogen gas mixture in the approximate ratio of 3:1 is prepared from a mixture of gases containing H, CO and N in which the H plus the CO are present in approximately the proportion of three times the volume of nitrogen. By subjecting such gas to catalytic treatment in the presence of steam, the CO is oxidized to $CO_2$ and a substantially equivalent volume of hydrogen is released in accordance with the general formula: $CO + H_2O = CO_2 + H_2$, so that the gas leaving the catalyst contains three volumes of hydrogen for each volume of nitrogen. The gas mixture thus obtained is subjected to pressure of nearly 100 atm. and is under said pressure purified and deprived of gases injurious to ammonia catalysis and then catalyzed under said pressure.

The present invention deals particularly with that stage of a process such as the de Jahn process wherein gases containing H, N and CO are conditioned for the first of the catalytic stages above referred to, i. e., wherein CO of the gas mixture is replaced by H.

The invention can be carried out in apparatus of the kind illustrated in the accompanying drawing which represents a diagrammatic elevation of such apparatus.

In the drawing 1 represents the line from the source of supply of gas to be conditioned. Speaking generally, such gas is usually withdrawn from the gas house or from gas holders. The blowers 2 propel the gases through the line 48ª into one end of the heater 47, then through 47 and out at the other end of 47, through the lines 49, 51, into and through the heat exchanger 47ª, then through line 49ª into and through one or more heat exchangers 47ᵇ and finally through line 52 into the converters 39. The converters contain the catalyst. The gas is introduced into the converters, passed through the catalyst and out at 43, at a temperature approximating 560° C., entering the heat exchanger 47ᵇ and passing therein in heat exchange relation with the incoming gases from the source 1. From the exchanger 47ᵇ the hot gases from the converters follow the line 44 and pass through the heat exchanger 47ª, leaving the same through line 45 and entering the heater 47. The heat exchangers 47ª and 47ᵇ are of any desired or required number. The gases from the converter, by the time they enter the heater 47, have given up their high temperature heat to the gases flowing in the opposite direction and the residual low temperature heat, though considerable, cannot, because of its low temperature, be transferred to more than a relatively small extent to the incoming gas and therefore cannot be utilized by merely increasing the number of heat exchangers. This residual heat of the converted gases may nevertheless be utilized and to this end they are introduced into the heater 47, wherein they vaporize water into the incoming gases and produce and maintain an approximate temperature of about 95° C. in the resultant gas-water vapor mixture leaving 47 and entering 47ª. The converted gases finally leave the system through the line 46 and are carried to the condensing system 4 where excess steam unused in the catalytic reaction is removed by condensation and thence through 5ª into gas holder 5 at a temperature of about 25° C. and ultimately to the compressor of the ammonia catalytic system.

Blowers 6 propel regulated quantities of air through the line 7 and branches 7ª into burners 8 which communicate with the interior of the converters 39. At said burners the air thus introduced supports the combustion of a portion of the gas under treatment by-passed from the main line 48ª through conduit 9 and metered at 10. The flame of the burner 8 may be employed either for auxiliary heating purposes or merely to serve as a means for introducing minor quantities of nitrogen to supplement a deficiency in nitrogen in the gas composition entering from the source 1 or for both purposes. If the gas at the source 1 is of such a composition that the gas in the outlet line 5ª of the drawing contains the precise desired ratio of hydrogen to nitrogen, and the heating system functions autothermically, then the lines 7 and 9 and the burners 8 would be out of operation, but generally the variation in gas composition is such as to make it necessary to operate the lines 7 and 9 under careful control in order that the final exit gases will possess the requisite ratio of hydrogen and nitrogen.

The heater 47, which may also be regarded as the first of the interchangers, is utilized for the purpose of producing in situ a certain portion of the required steam or water vapor content of the reaction gas mixture, the remaining low temperature heat of the outgoing converted gas from 47ª being used as the source of the requisite heat. The heater 47 is for this purpose operated as a so-called "wetted tube" interchanger in which water is continuously circulated by the pump B and pipe C into one end of the heater 47 and distributed so that it flows down over the inside surface of the interchanger tubes and in intimate contact with the raw gas from the main line 48ª. The inner arrangement of the head 12 of the heater 47 is such as to cause distribution of the water through all of the tubes and not to allow the whole of the water to pass as a concentrated mass through only a limited number of said tubes. The result of this operation is that the water circulating through the heater 47 becomes heated by heat exchange with the still hot converted gas from 49 while the raw gas from the main line 48ª becomes heated and mixes with such water vapor (steam) as is evaporated into it from the circulating water at this temperature. The excess water is recirculated as stated, the volume of circulating water being maintained constant by appropriate addition of fresh water.

When, as is ordinarily the case, the conditions of temperature, etc., are not sufficient to produce in the heater 47 all of the steam required in the converters 39, the balance is added at E as low pressure steam from 48, which is metered at 11.

The connections are such that this steam may be allowed to enter the system either at A or at E but for the purposes of the operations to be described, the connection at A is to be regarded as closed, so that all steam which is added as low pressure steam from 48 will enter the system at E only.

For satisfactory operation of this process the temperature in 39 must be maintained within certain limits, for example such that the temperature of the exit converted gases in 43 is 540–560° C.

In my wetted tube exchanger I have to a large extent provided a means of automatically maintaining the temperature within the required limits. For example, a rise in temperature of the gas in 43 tends to make the resulting subsequent rise in temperature of the gases leaving 39 much less than it would be were the wetted tube interchanger not in operation. Thus when for any reason the temperature of the exit gases leaving converters 39 through pipe 43 rises, the temperature of the exit gases entering wetted tube interchanger 47 through pipe 45 also rises, which results in an increased evaporation of steam into the gas entering wetted tube interchanger 47 through pipe 48ª, so that the gas leaving wetted tube interchanger 47 through pipe 49 carries with it more steam. This mixture of gas and steam after passing the other two interchangers enters the converters through pipe 52 and since the mass of steam travelling with the gas is greater than it was previously, the heat of reaction (which is constant) in converter 39 is used to raise the temperature of a mass which is greater than before and therefore the rise in temperature is less. This obviously means that when the exit temperature from converters 39 rises, the resultant increased mass of steam tends and actually does, make the resulting subsequent rise in temperature less than it would be were the wetted tube interchanger not in operation.

Contrariwise if the temperature of the gas leaving converters 39 through pipe 43 falls, a lessened quantity of steam is evaporated in wetted tube interchanger 47 and the stream of gas entering converters 39 carries with it a less volume of steam so that the heat of reaction being used to raise the temperature of a smaller mass produces a greater rise in temperature than would be the case were the wetted tube interchanger not in operation.

As a result of the conditions of operation set forth above, I find in actual practice that the variations in the exit temperature of the gas in 43 are sufficient to govern the quantity of steam evaporated in wetted tube interchanger 47 in such a manner that the variation in the exit temperature of the gas leaving converters 39 through pipes 43 (and therefore of the temperature in 39) is materially lessened as compared with the variations when the wetted tube interchanger is not in operation. In either case then, with a rise or fall in the temperature of the gas in 43, the effect of the wetted tube exchanger is to limit or reduce the variations of temperature in 39. This function of the wetted tube exchanger 47 to serve in the system as an automatic means for temperature regulation renders it unnecessary to operate the burners 8 as the control for the desired temperature in 39.

This is a material advantage inasmuch as the operation of the burners 8 is wasteful of gas, it being obvious that any gas withdrawn through the line 9 and consumed at the burner 8 could be employed to better advantage by being treated for further use in the converters 39 than in being consumed in adapting the converters 39 to function properly.

In cases where temperature regulation has been attempted by manipulation of the steam admitted from 48 at E, the described function of the wetted tube exchanger 47 also enables the operator either to dispense with such regulation altogether or to greatly reduce it, in cases where, for example, the temperature fluctuations are abnormal and a special regulation of the steam admitted from 48 may therefore prove desirable. Similarly, in those cases where temperature regulation is made dependent or partially dependent on by-passing some of the gas around one or the other of the interchangers 47$^a$ or 47$^b$, such by-passing may be dispensed with or used to a far more limited extent when the heater 47 is incorporated in the system.

The described utilization of the heater 47 as a wetted tube interchanger, is not only of value as a temperature regulator and a means of producing steam, but it increases the heat transfer efficiency of this interchanger. Among other advantages of utilizing the heater 47 as described are the production of steam in situ; the utilization of heat of the converted hot gas, not otherwise readily utilizable, as a means for producing steam; the more complete utilization of the heat of the converted exit gas; increased rate of heat transfer; and general increase of economy, efficiency and ease of operation.

It will thus be observed that from many aspects material advantages flow from the procedure described in this specification. It is understood that variations in the specific arrangements and operations hereinabove described may be undertaken without departing from the spirit of this invention.

I claim:

1. The process which consists in bringing gas containing carbon monoxide into contact with a catalyst in the presence of steam, leading the hot exit gases into heat exchange relation with the incoming unconverted gas while circulating water in contact with such unconverted incoming gas within the heat exchange system to produce in said gas water vapor to participate subsequently in the catalytic procedure.

2. The process which consists in bringing gas containing carbon monoxide into contact with a catalyst in the presence of steam, leading the hot exit gases into heat exchange relation with the incoming unconverted gas while circulating water in contact with such unconverted incoming gas within the heat exchange system to produce in said gas water vapor to participate subsequently in the catalytic procedure and adding to the unconverted gas steam from an extraneous source to make up the total amount of steam necessary for the catalytic procedure.

3. In the art of bringing carbon monoxide into contact with a catalyst in the presence of steam, the process which consists in assisting the maintenance of a relatively constant temperature at the catalyst by leading the hot exit gases into heat exchange relation with the incoming unconverted gas and, while the hot exit gases are thus effective on said incoming gas, circulating water in contact with such unconverted incoming gas within the heat exchange system.

4. In the art of bringing carbon monoxide into contact with a catalyst in the presence of steam, the process which consists in assisting the maintenance of a relatively constant temperature at the catalyst by leading the hot exit gases into heat exchange relation with the incoming unconverted gas and, while the hot exit gases are thus effective on said incoming gas, circulating water in contact with such unconverted incoming gas within the heat exchange system to produce in said gas water vapor to participate subsequently in the catalytic procedure and together with steam from an extraneous source to make up the total amount of steam necessary for the catalytic procedure.

5. The process which consists in bringing gas containing CO into contact with a catalyst in the presence of steam, leading the hot exit gases from the catalyst into heat exchange relation with the incoming unconverted gas and limiting variations of temperature at the catalyst by passing the exit gas past a heat transferring wall on the opposite side of which flows the incoming gas in the presence of water vaporizing into said incoming gas.

6. The process which consists in bringing gas containing CO into contact with a catalyst in the presence of steam, leading the hot exit gases from the catalyst into heat exchange relation with the incoming unconverted gas and limiting variations of temperature at the catalyst by passing the exit gas past a heat transferring wall on the opposite side of which flows the incoming gas in the presence of water vaporizing into said incoming gas, said water vapor being carried forward by said incoming gas and participating subsequently in the catalytic procedure.

7. The process which consists in bringing gas containing CO into contact with a catalyst in the presence of steam, maintaining the temperature of the catalyst at a relatively constant point, leading the hot exit gases from the catalyst into heat exchange relation with the incoming unconverted gas until the high temperature heat of the exit gases available for transfer to the incoming gases has been practically exhausted, one stage of the heat exchange system including the circulation of water at a temperature of approximately 100° C. in contact with the incoming gas at a time when said gas is moving in heat abstracting relation with reference to the exit gases, to produce in said gas water vapor to participate subsequently in the catalytic procedure.

8. In an apparatus of the character set forth heat transferring means comprising a plurality of two-path heat transferring units connected in series, one of said units being so located with respect to the others that the exit temperature of the heat extracting path thereof is approximately 95° C., means for admitting steam to one of the heat extracting paths of one of said units, means for controlling the amount of steam admitted to said path and means for circulating water through the heat extracting path of that one of the heat transferring units in which the aforesaid exit temperature of approximately 95° C. prevails.

9. Apparatus of the character described, comprising a catalytic converter, means for leading gas mixed with steam into said converter, a plurality of heat interchangers for transferring heat of the exit gases to the incoming gases, one of said heat exchangers being so located with respect to the others that the exit temperature of the heat extracting path thereof is approximately 95° C., a steam inlet communicating with the incoming gases in one of the heat exchangers, means for controlling the amount of steam admitted through said inlet and means for introducing water into the path of the incoming gas in that one of the said interchangers wherein the aforesaid exit temperature of approximately 95° C. prevails.

In testimony whereof I have hereunto set my hand.

WALTER H. KNISKERN.